United States Patent Office 3,071,497
Patented Jan. 1, 1963

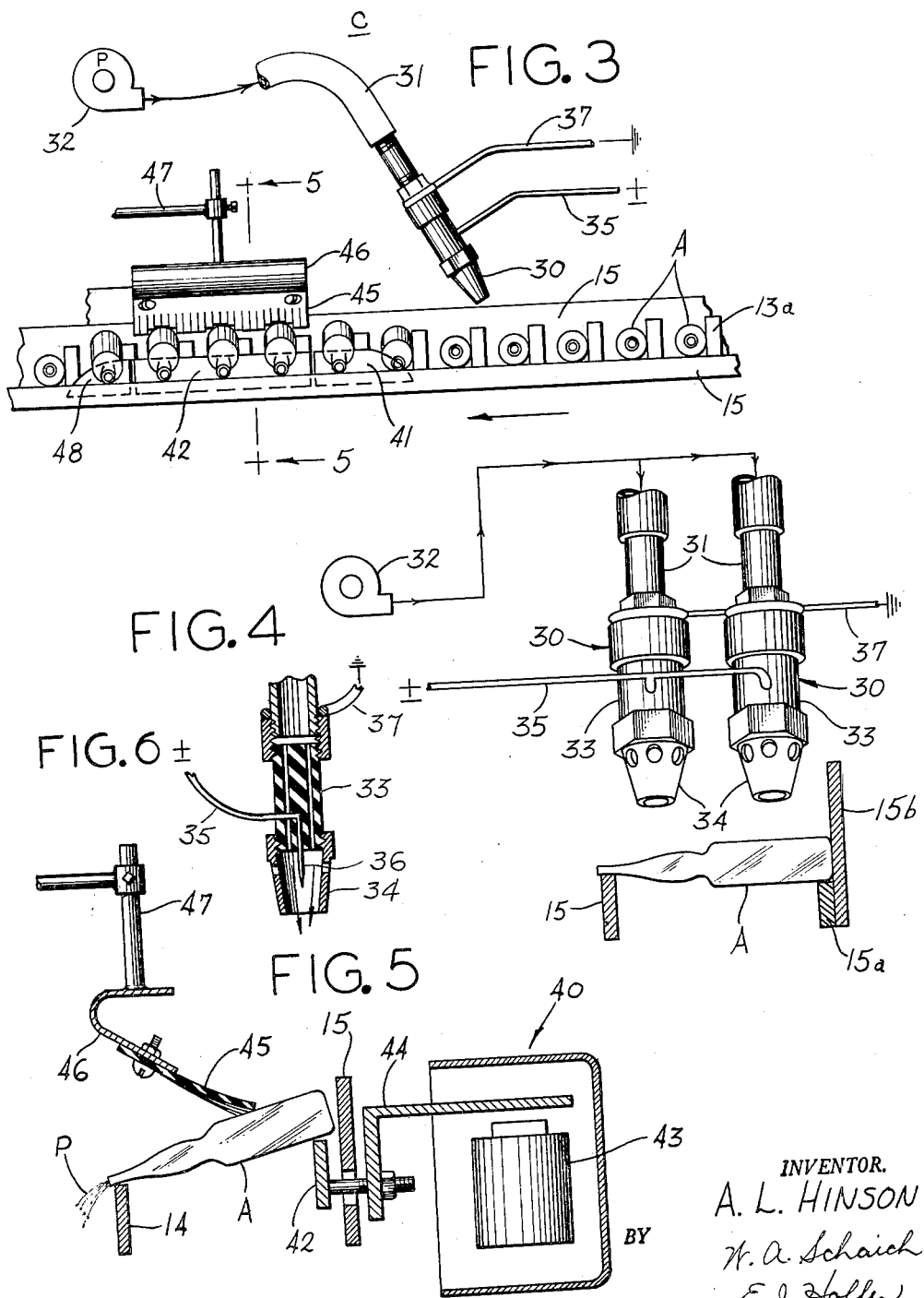

3,071,497
METHOD AND APPARATUS FOR CLEANING SMALL GLASS CONTAINERS
Arthur L. Hinson, Mauricetown, N.J., assignor to Kimble Glass Company, a corporation of Ohio
Filed Aug. 28, 1959, Ser. No. 836,802
12 Claims. (Cl. 134—1)

The present invention relates to the cleaning of vessels or containers and more specifically to an improved dry method and apparatus for removing foreign matter from small glass containers having restricted neck openings. Such containers comprise vials, ampuls, bottles, syringe cartridges and the like used for retaining drug, pharmaceutical or other products where cleanliness and/or sterility is essential.

In the manufacture of small glass containers having restricted neck openings, the containers are frequently contaminated by minute particles of glass dust as well as other foreign matter. Glass dust particles may originate from scoring and then removing the so-called "bell end" or moil portion of containers such as ampuls or vials having lengthy stems adapted to filling and sealing. These particles as well as any foreign matter are objectionable to the pharmaceutical industry and must be removed prior to packaging the product. The standards of cleanliness are by necessity extremely exacting, the presence of any foreign particles in an injectable solution being sufficient cause for rejection of the packaged product.

Various cleaning procedures and agents such as detergents dissolved in water have been introduced into the containers to wash the foreign particles therefrom. Such washing procedures have been extensively conducted by both the container manufacturer and the pharmaceutical producer prior to packaging. These procedures have removed the major part of the foreign matter and produced an acceptable product for packaging drugs, but it has been observed that some extremely minute particles may still remain within the container either resting on its bottom or adhering to its internal surfaces especially in sharply contour areas. These minute particles are not permissible in drug and pharmaceutical packaging.

Accordingly, it is an object of the present invention to provide improved method and apparatus for eliminating foreign particles from glass containers by a dry process readily adaptable to automatic manufacturing of the container.

Another object of the present invention is to provide novel method and apparatus for eliminating the electro-static attraction between glass containers and foreign particles contained therein and subjecting the containers to vibration generating means while in downwardly inclined relation to eject the foreign particles therefrom.

Another object of the present invention is to provide an improved dry method and apparatus for practicing same to efficiently and expeditiously remove glass dust particles from small glass containers having restricted neck openings, the apparatus being applicable to automatic glass container manufacturing equipment and having features of structural and operational simplicity and relatively low-cost installation and operation.

A further object of this invention is to provide a unique method of removing loose foreign particles from small glass containers having restricted neck openings by substantially eliminating static electrical charges from their surfaces and contaminants and vibrating the containers in downwardly inclined relation to forcibly eject the particles therefrom.

A still further object of the present invention is to provide simplified apparatus for eliminating static electrical charges from small glass containers having restricted neck openings by an impinging stream of ionized gas and imparting vibrations into the walls of the container during the cleaning process, the apparatus being utilizable in combination with existing glass container manufacturing equipment adapted to continuous automatic operation.

Other objects of the present invention will be in part apparent and in part pointed out hereinafter.

In the drawings:

FIG. 3 is an enlarged fragmentary side elevational view of the container cleaning station illustrated in FIG. 2.

FIG. 4 is a further enlarged vertical sectional view of the container conveying means and apparatus for subjecting the containers to electrical charge elimination.

FIG. 5 is a vertical sectional view taken along the line 5—5 of FIG. 3 illustrating means for downwardly inclining the containers and subjecting the same to mechanical vibration for eliminating the foreign particles.

FIG. 6 is a vertical sectional view of one gas discharge nozzle.

The apparatus as illustrated on the drawings shows a preferred embodiment of the invention. The apparatus comprises a horizontal conveyor 10 which supports the glass containers in spaced-apart recumbent position with their axes transverse to the direction of travel of the conveyor. The glass containers which are hereinafter referred to as ampuls A are carried along in a horizontal path by the upper reach of a conveyor mechanism.

Figure 1:
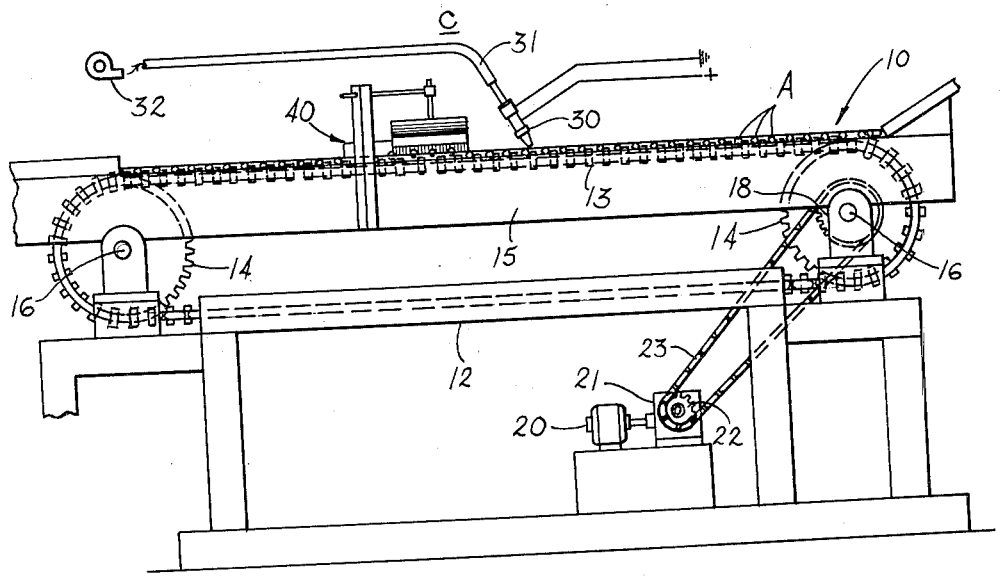
FIG. 1 is a side elevational view of one embodiment of apparatus for practicing the present invention including article conveying means.

The conveying means which advances the ampuls A to the cleaning station C and then carries them away from the latter is mounted upon a main supporting frame 12 and comprises a pair of parallel horizontally-extending finger chains 13 trained over a pair of sprockets 14 with the upper reaches riding upon the supporting rails 15. The sprockets 14 are arranged in pairs at horizontally spaced-apart points on the frame 12 and are mounted upon cross shafts 16. Cross shafts 16 shown on the right-hand side of FIG. 1 has a gear wheel 17 keyed thereto which is driven by a motor 20 operating through a gear reduction assembly 21, a sprocket 22 and an endless chain 23. By this mechanism the upper reaches of finger chains 13 are moved continuously from loading to unloading position or right-to-left as shown in FIG. 1. The ampuls A are moved along over the stationary rails 15 by the pairs of upright lugs 13a of the finger chains 13.

Figure 2:
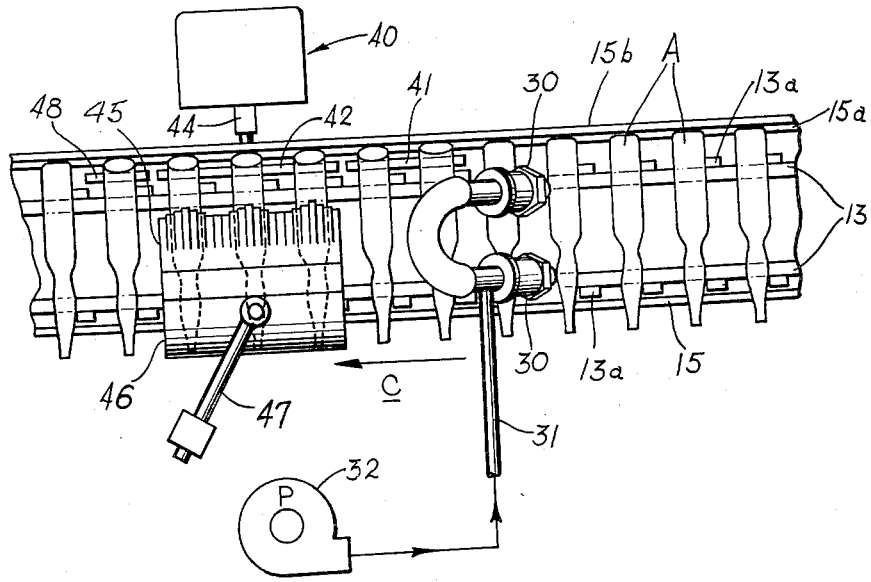
FIG. 2 is an enlarged fragmentary plan view of the container cleaning station of the subject apparatus.

As shown in FIGS. 2 and 4 ampuls A are conveyed along in succession and in spaced-apart recumbent position with their bottom portions resting on stationary rail portion 15a held in position laterally against upstanding rail portion 15b. The stem portions of the ampuls are rolled along on stationary rail 15 disposed in parallel alignment with opposing rail portions 15a and 15b. The rails extend throughout the upper reaches of the conveying chains including the cleaning station C.

A pair of discharge nozzles 30 are arranged adjacent the upper reaches of the chains at station C directed downwardly at the ampuls conveyed therebeneath. As shown in FIGS. 2, 3 and 4 the discharge nozzles are disposed angularly in side-by-side relation normal to the direction of ampul travel. Each nozzle 30 is adapted to conduct a stream of pressurized gaseous fluid such as air to impinge upon the external surfaces of the ampuls. Each discharge nozzle is connected to an air line 31 adapted to conduct pressurized air from pump 32 thereto.

Each discharge nozzle 30 is comprised of a non-conducting body portion 33 having a metallic cap 34 affixed thereto. A high-voltage electrical line 35 carrying alternating current passes through the insulating body portion 33 of each nozzle and connects to an ionizing post or needle 36 disposed axially within nozzle cap 34. Each ionizing post or needle 36 which carries a potential of 5,000 to 7,000 volts at very low amperage is adapted to ionize the pressurized air flowing therepast. An upper region of each nozzle above insulating body portion 33 is grounded by a suitable ground wire 37. Thus, a high-voltage electrical field is created within the region of nozzle cap 34 to ionize the air alternatingly with positive and negative charges as it emits therefrom and impinges upon ampuls A as shown in FIG. 4. Each of the nozzles preferably emits ionized air at a pressure of above 10 p.s.i. gauge and is located in proximity to the ampuls to surround the same with ionized air.

It is necessary that the metal parts of the nozzle assembly be properly grounded. This is accomplished by supporting the nozzles with metallic brackets extending from the grounded frame 12 of the ampul conveyor. A grounding lug is provided at the base of each nozzle. The high voltage lead 35 is retained by insulators and extends from a high-voltage supply source (not shown) to the ionizing nozzles. The power supply source may consist of a Simco Midget Power Unit, Model D-1682, operating at 0.25 amp., 120 volts, 60 cycle current, manufactured by the Simco Company, Lansdale, Pennsylvania.

Immediately following subjection the ampul to the ionizing gas streams the ampuls are conveyed to the vibrating apparatus 40. A stationary rail member 41 having an inclined surface is adapted to elevate the bottom ends of the ampuls. The ampuls are placed in downwardly inclined relation at an acute angle of about 15° from horizontal. As shown in FIGS. 2 and 3 rail member 41 elevates the closed end portion of each ampul successively while its stem portion rests upon opposing horizontal rail 15. The transversely aligned lugs 13a carry each of the ampuls over rail member 41 into this downwardly inclined arrangement.

After the bottom portion of each ampul is elevated by member 41, it is conveyed along into contact with vibratory element 42 which is connected to a mechanical vibrator 43 by connecting arm 44. While the ampuls are downwardly inclined with their bottoms in contact with vibratory element 42, their intermediate upper side surfaces are contacted and retained by a resilient member 45 which may be fabricated of a serrated rubber sheet or other resilient material. One edge portion of resilient member 45 is retained in stationary relation by a mounting plate 46 which is in turn retained by a stationary adjustable arm 47.

When each ampul A is acted upon by vibrator element 42, the ampul being inclined is disposed in a favorable position to facilitate the elimination of glass chips, dust or other particles therefrom. The particles P which have had their charges eliminated by the impinging and surrounding ionized air are dislodged from the surfaces of the ampul by the vibratory force of the vibrator. One form of vibrating mechanism consists of an electrically actuated vibrator having a frequency of 120 oscillations per second. This frequency is in no way referred to as being restrictive but as merely representative of a commercially available suitable vibrator assembly. The amplitude of vibration of mechanism 40 is utilized at a prescribed near maximum value to effect optimum particle removal. The amplitude of vibration should not be increased to a level whereby the glass containers might be dislodged and ejected from the conveyor. Thus, the degree of vibration to which the ampuls are subjected consists of sufficient vibratory force to eliminate substantially all of the particles P from the containers as indicated in FIG. 5 while retaining full control over the ampul arrangement on the conveyor. Immediately following subjection of each ampul to vibratory forces, the bottom portion of each ampul is lowered by a downwardly inclined stationary rail member 48 to resume its horizontal alignment on the conveyor rails 15.

As described hereinbefore, it has been observed that a prescribed percentage of glass dust particles within small glass containers having restricted neck openings is not readily dislodged or removed from the container surface by vibration alone or by other conventional cleaning means. These glass particles are attracted to the glass surface by forces which are indicated as comprising static electrical charges. In order to dislodge and remove the particles with facility in rapid cleaning procedures, it has been found necessary to neutralize the static electrical charges which exist between the glass or other foreign particles and the glass container surfaces. This has been accomplished as described hereinabove by mounting a static eliminator device actuated by an electrical field or other source such as radioactive material being disposed in proximity to the container. The container is then vibrated with the open end pointing downwardly while it is retained in yieldable relation to discharge the essentially uncharged particles.

In the manufacture of glass ampuls the combined action of static elimination and mechanical vibration has been found to reduce the percentage of containers contaminated with particles of glass dust during one production campaign from approximately 20% to less than 1%. The subject method and apparatus has facilitated a substantial improvement in quality and quality control in the production of small glass containers so that they may be shipped to a packager having considerably greater cleanliness than heretofore obtainable.

The subject dry process eliminates the need for any subsequent heating or drying operations to ensure the removal of liquid components such as aqueous wash solutions following cleaning. The containers as cleaned according to the foregoing procedure are ready to be packed in cartons for shipment having a very advanced degree of cleanliness.

Modifications may be resorted to within the spirit and scope of the appended claims.

I claim:

1. A dry method of removing foreign particles from glass containers having restricted open ends such as vials, ampuls, bottles and the like, said method comprising the steps of subjecting each of said glass containers to at least partial elimination of static electrical charges from their surfaces, at least partially inverting each of said glass containers with their open ends directed downwardly, and vibrating each of said glass containers to remove the foreign particles therefrom.

2. A dry method of removing foreign particles from glass containers having restricted open ends such as vials, ampuls, bottles and the like, said method comprising the steps of subjecting each of said glass containers to an impinging stream of ionized gas to substantially eliminate static electrical charges from their surfaces, positioning each of said glass containers in downwardly inclined arrangement, and subjecting each of said containers to mechanical vibration to remove the said foreign particles therefrom.

3. The method in accordance with claim 2 including the step of continuously advancing the said glass containers in aligned relation during the aforesaid steps.

4. A dry method of removing foreign particles from glass containers having restricted open ends such as vials, ampuls, bottles and the like, said method comprising the steps of continuously advancing the said glass containers in aligned spaced-apart relation, subjecting each of said glass containers to an impinging stream of ionized gaseous fluid to substantially eliminate static electrical charges from their surfaces, inclining each of said glass containers at an acute angle to horizontal with their open ends directed downwardly, and subjecting each of said containers to mechanical vibration while downwardly inclined to remove the said foreign particles therefrom.

5. The method in accordance with claim 4 including a step of downwardly inclining the said containers at an angle of about 15° to horizontal and contacting their upwardly extending closed end portions by vibratory means to remove the foreign particles therefrom.

6. The method in accordance with claim 4 including the step of directing a stream of pressurized ionized air to impinge upon the side surfaces of each of said individual containers during their advancing conveyance.

7. The method in accordance with claim 4 including the step of retaining the said glass containers in downwardly inclined yieldable relation for their mechanical vibration for a sufficient interval to remove substantially all glass dust and foreign particles therefrom.

8. Apparatus for dry cleaning glass containers having restricted neck openings such as vials, ampuls, bottles and the like comprising a source of pressurized gaseous fluid, means for ionizing and directing an impinging stream of said pressurized gaseous fluid at the side surfaces of said glass containers, means for supporting said glass containers in downwardly inclined yieldable relation, and vibratory means adapted to contact and vibrate said glass containers in downwardly inclined relation for removal of foreign particles therefrom.

9. Apparatus for removing foreign particles from glass containers having restricted neck openings such as vials, ampuls, bottles and the like comprising means for continuously advancing said glass containers in a prescribed path, a source of pressurized gaseous fluid, means for ionizing said pressurized gaseous fluid, at least one discharge nozzle adapted to emit a stream of ionized gaseous fluid to impinge on the said glass containers, means for supporting each of said glass containers in downwardly inclined position arrangement, and means for mechanically vibrating said containers in downwardly inclined arrangement during their advancing movement.

10. Apparatus for removing foreign particles from small glass containers such as vials, ampuls and the like having restricted neck openings comprising a conveyor for conveying said containers in spaced-apart recumbent position, a source of pressurized gaseous fluid, means for ionizing said gaseous fluid consisting of an electrical field, at least one discharge nozzle mounted adjacent said conveyor and adapted to emit a stream of said ionized gaseous fluid to impinge and surround the said conveyed containers and eliminate static electrical charges therefrom, means for supporting said containers at an acute angle in downwardly inclined yieldable relation during their conveyance, and a mechanical vibrator adapted to contact each of said ampuls in downwardly inclined relation to vibrate the same for removal of said foreign particles therefrom.

11. Apparatus for removing foreign particles from small glass containers such as vials, ampuls, and the like comprising a conveyor for transporting said containers in spaced-apart recumbent position with their open-ends all pointing in the same direction, a source of pressurized air, at least one discharge nozzle mounted adjacent said conveyor and adapted to emit a stream of pressurized air from said source to impinge and surround each of said containers, electrical leads connected to said discharge nozzle to energize the same and ionize the pressurized air passing therethrough, means for supporting each of said containers in downwardly inclined yieldable relation during their conveyance immediately adjacent said discharge nozzle, and a mechanical vibrator adapted to contact each of said ampuls in downwardly inclined relation for their vibration to remove said foreign particles therefrom.

12. A dry method of removing foreign particles from glass containers having restricted open ends such as vials, ampuls, bottles and the like, said method comprising the steps of subjecting each of said glass containers to at least partial elimination of static electrical charges from their internal surfaces, and at least partially inverting and agitating each of said glass containers in air with their open ends directed downwardly to remove the foreign particles therefrom.

References Cited in the file of this patent

UNITED STATES PATENTS

| | | |
|---|---|---|
| 844,300 | Chapman | Feb. 12, 1907 |
| 861,307 | McKinney | July 30, 1907 |
| 1,169,428 | Rogers | Jan. 25, 1916 |
| 2,830,605 | Kleeman | Apr. 15, 1958 |